(12) United States Patent
Inoue et al.

(10) Patent No.: US 8,797,829 B2
(45) Date of Patent: Aug. 5, 2014

(54) OBSTACLE DETECTION DEVICE

(75) Inventors: Satoru Inoue, Tokyo (JP); Ryotaro Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 170 days.

(21) Appl. No.: 13/577,428

(22) PCT Filed: May 19, 2010

(86) PCT No.: PCT/JP2010/003363
§ 371 (c)(1), (2), (4) Date: Aug. 6, 2012

(87) PCT Pub. No.: WO2011/145140
PCT Pub. Date: Nov. 24, 2011

(65) Prior Publication Data
US 2012/0307594 A1 Dec. 6, 2012

(51) Int. Cl.
*G01S 15/08* (2006.01)
(52) U.S. Cl.
USPC .......................................................... 367/98
(58) Field of Classification Search
USPC ....................................................... 367/98, 99
See application file for complete search history.

(56) References Cited

U.S. PATENT DOCUMENTS

2012/0307594 A1* 12/2012 Inoue et al. ..................... 367/99

FOREIGN PATENT DOCUMENTS

| CN | 1580815 A | 2/2005 | |
|---|---|---|---|
| CN | 1818711 A | 8/2006 | |
| JP | 51-22465 | 2/1976 | |
| JP | 55072880 A * | 6/1980 | ............... G01S 7/62 |
| JP | 58-113777 A | 7/1983 | |
| JP | 61-105479 A | 5/1986 | |
| JP | 62-220889 A | 9/1987 | |
| JP | 7-7056 B2 | 1/1995 | |
| JP | 9-318738 A | 12/1997 | |
| JP | 2006-298266 A | 11/2006 | |

* cited by examiner

*Primary Examiner* — Daniel Pihulic
(74) *Attorney, Agent, or Firm* — Birch, Stewart, Kolasch & Birch, LLP

(57) ABSTRACT

An obstacle detection device controls distance sensors to cause the distance sensors to transmit a transmission wave during a fixed time period, measures a first time which has elapsed from a time at which the transmission starts to a time at which a reflected wave is detected, and a second time which has elapsed a time at which the above-mentioned transmission is stopped to a time at which the reflected wave disappears, and determines that an obstacle exists when a time difference between the above-mentioned first time and the above-mentioned second time is equal to or shorter than a predetermined allowed time. Therefore, the obstacle detection device can reduce the time required for the determination to at least one-half that provided by a related art technique, and improves the accuracy of the detection of an object moving at a relatively high speed.

9 Claims, 16 Drawing Sheets

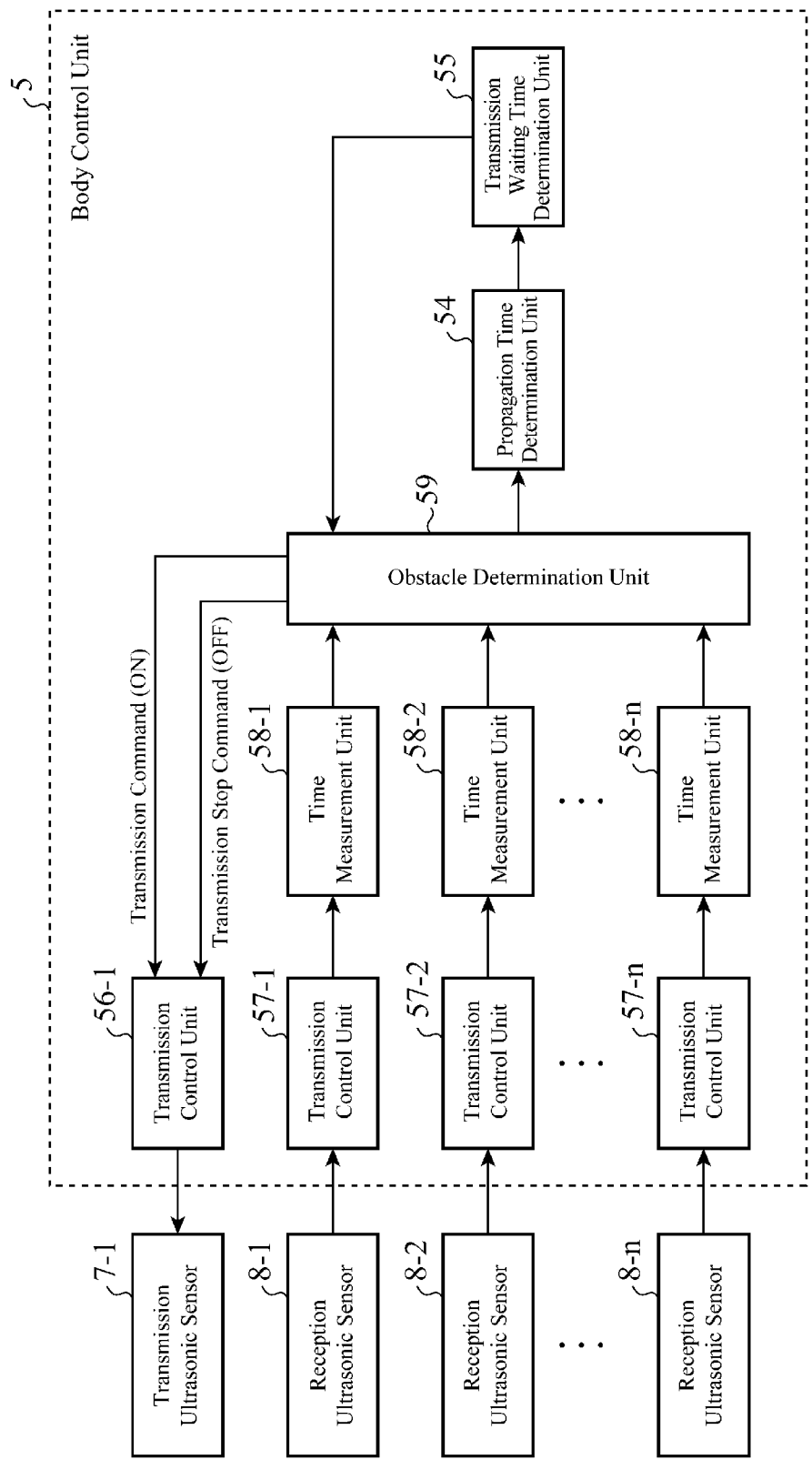

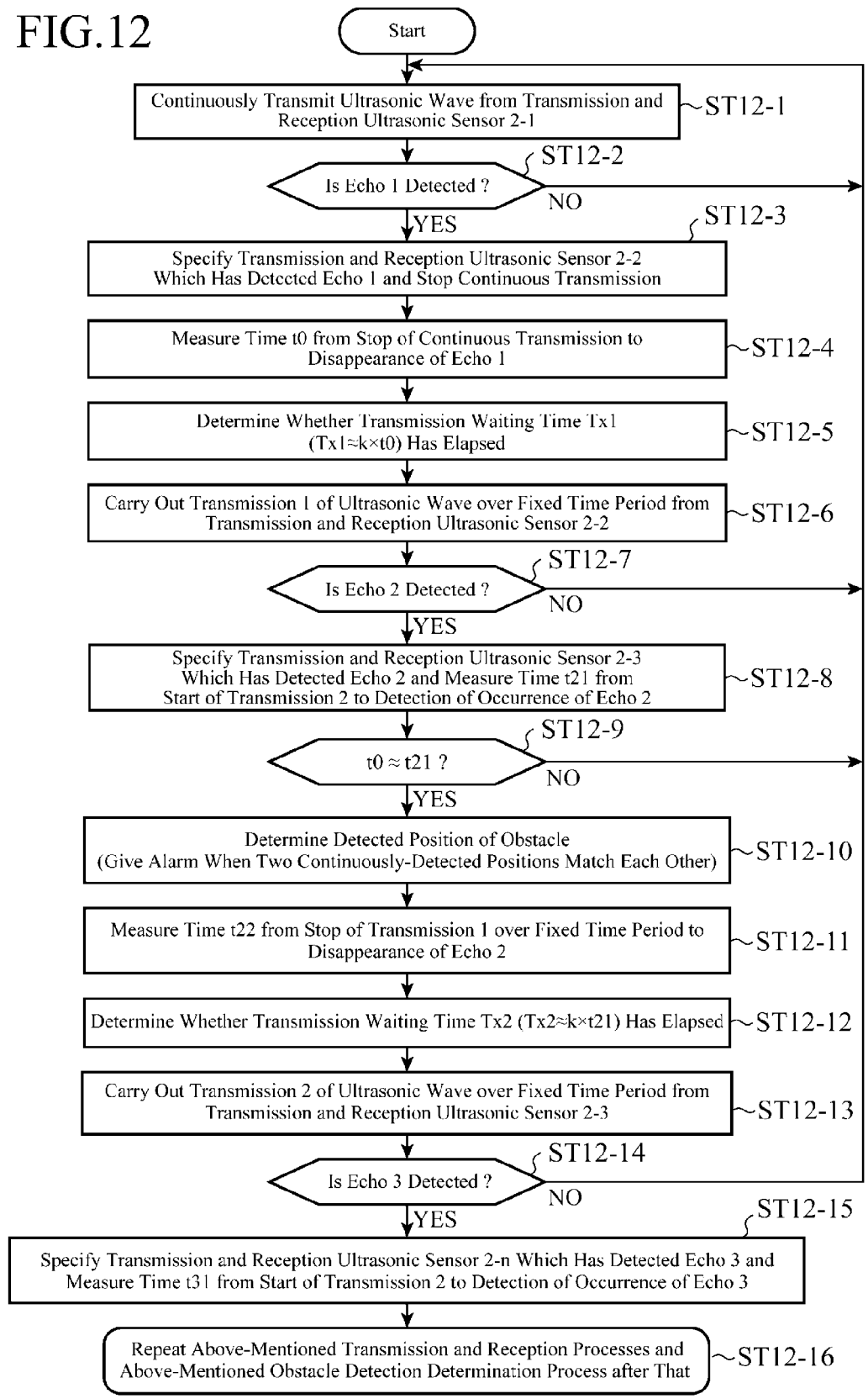

FIG.15

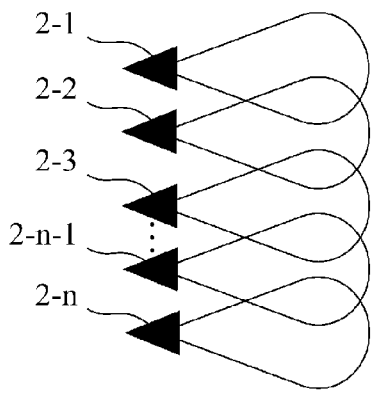

Table 1

[Transmission and Reception Sequence at Time of Detecting No Obstacle]

Transmission Ultrasonic Sensor: 2-2
Reception Ultrasonic Sensor: 2-1, 2-3, 2-n-1, 2-n
↓

Transmission Ultrasonic Sensor: 2-3
Reception Ultrasonic Sensor: 2-1, 2-2, 2-n-1, 2-n
↓

Transmission Ultrasonic Sensor: 2-n-1
Reception Ultrasonic Sensor: 2-1, 2-2, 2-3, 2-n
↓

Transmission Ultrasonic Sensor: 2-2
Reception Ultrasonic Sensor: 2-1, 2-3, 2-n-1, 2-n
↓

Transmission Ultrasonic Sensor: 2-3
Reception Ultrasonic Sensor: 2-1, 2-2, 2-n-1, 2-n

FIG.16

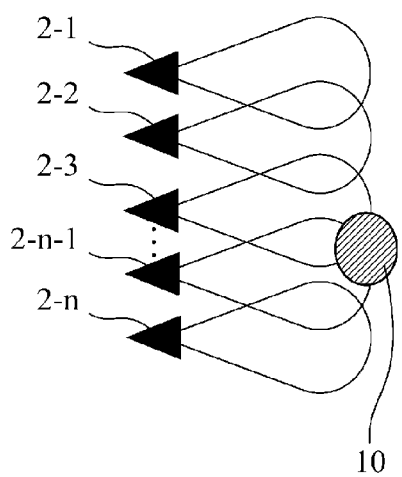

Table 2

[Transmission and Reception Sequence at Time of Detecting Obstacle]

Transmission Ultrasonic Sensor: 2-2
Reception Ultrasonic Sensor: 2-1, 2-3, 2-n-1, 2-n
↓

Transmission Ultrasonic Sensor: 2-3
Reception Ultrasonic Sensor: 2-1, 2-2, 2-n-1, 2-n
↓   (Detection of Obstacle)

Transmission Ultrasonic Sensor: 2-3
Reception Ultrasonic Sensor: 2-1, 2-2, 2-n-1, 2-n
↓

Transmission Ultrasonic Sensor: 2-3
Reception Ultrasonic Sensor: 2-1, 2-2, 2-n-1, 2-n
↓

When Being Unable to Detect Reflected Wave Any More
↓

Transmission Ultrasonic Sensor: 2-n-1
Reception Ultrasonic Sensor: 2-1, 2-2, 2-3, 2-n

OBSTACLE DETECTION DEVICE

FIELD OF THE INVENTION

The present invention relates to an obstacle detection device which improves time intervals for the detection of an obstacle by using ultrasonic sensors mounted in front and rear parts and on right and left sides of a vehicle without reducing the reliability of the detection of an obstacle existing around the vehicle.

BACKGROUND OF THE INVENTION

In order to avoid erroneous detection due to electric noise, a conventional obstacle detection device determines whether it has continuously detected that an obstacle is existing at the same position (in the same direction and at the same distance) twice, and, when having continuously detected that an obstacle is existing at the same position twice, recognizes that there is an obstacle.

For example, according to a related art technique described in patent reference 1, a continuous transmission of an ultrasonic pulse is carried out, and, when a reflection signal having the same pulse width has been continuously detected, it is recognized that the reflection signal has come from an obstacle.

Further, according to a related art technique described in patent reference 2, because a simultaneous transmission of ultrasonic pulses from a plurality of ultrasonic sensors causes interference between transmission waves and hence an undetectable area, any two adjacent ultrasonic sensors which transmit transmission waves which may interfere with each other are prevented from transmitting transmission waves simultaneously.

RELATED ART DOCUMENT

Patent reference

Patent reference 1: Japanese Patent No. 1974040
Patent reference 2: Japanese Unexamined Patent Application Publication No. 2006-298266

SUMMARY OF THE INVENTION

According to the above-mentioned related art techniques, in order to avoid a malfunction due to extraneous sound noise, an ultrasonic wave is transmitted a number of times at fixed time intervals, and it is determined that an obstacle exists when the time at which a reflected wave appears after each of some of the multiple transmissions has been carried out matches each other. Therefore, a problem is that a delay occurs in the determination of whether an obstacle exists. Further, because the frequency with which an ultrasonic wave is transmitted and the lengths of the time intervals at which the determination is carried out cannot be shortened, there is a possibility that a failure to detect an obstacle moving at a high speed occurs. This is particularly a problem that frequently arises for an obstacle detection device having a larger number of sensors.

The present invention is made in order to solve the above-mentioned problems, and it is therefore an object of the present invention to provide an obstacle detection device which improves time intervals at which ultrasonic sensors transmit ultrasonic waves, thereby improving the accuracy of the detection of an object moving at a relatively high speed.

In accordance with the present invention, there is provided an obstacle detection device including: a plurality of distance sensors each having a transmitting and receiving function; a transmission and reception controlling unit for controlling the above-mentioned distance sensors to cause the distance sensors to transmit a transmission wave during a fixed time period to detect a reflected waves from an obstacle; a time measurement unit for measuring a first time which has elapsed from a time at which the above-mentioned transmission starts to a time at which a reflected wave is detected, and a second time which has elapsed a time at which the above-mentioned transmission is stopped to a time at which the reflected wave disappears; and an obstacle determination unit for determining that an obstacle exists when a time difference between the above-mentioned first time and the above-mentioned second time is equal to or shorter than a predetermined allowed time.

As mentioned above, because the obstacle detection device in accordance with the present invention can carry out two measurements at a time at which a reflected wave is received and at a time at which the reflected wave disappears, the obstacle detection device can reduce the time required for the determination to at least one-half that provided by a related art technique, and provides an advantage of improving the accuracy of the detection of an object moving at a relatively high speed.

BRIEF DESCRIPTION OF THE FIGURES

FIG. 5-1 is a flow chart explaining the operation of the obstacle detection device in accordance with Embodiment 1;

FIG. 5-2 is a flow chart explaining the operation of the obstacle detection device in accordance with Embodiment 1;

FIG. 6 is a block diagram showing the structure of an obstacle detection device in accordance with Embodiment 2 of the present invention in detail;

FIG. 8-1 is a flow chart explaining the operation of the obstacle detection device in accordance with Embodiment 2;

FIG. 8-2 is a flow chart explaining the operation of the obstacle detection device in accordance with Embodiment 2;

FIG. 11-1 is a flow chart explaining the operation of the obstacle detection device in accordance with Embodiment 3;

FIG. 11-2 is a flow chart explaining the operation of the obstacle detection device in accordance with Embodiment 3;

FIG. 12 is a flow chart explaining the operation of an obstacle detection device in accordance with Embodiment 4;

FIG. 15 is a transmission and reception sequence diagram at a time at which no obstacle is detected; and FIG. 16 is a transmission and reception sequence diagram at a time at which an obstacle is detected.

EMBODIMENTS OF THE INVENTION

Hereafter, the preferred embodiments of the present invention will be described with reference to the accompanying drawings.

Embodiment 1

Figure 1:
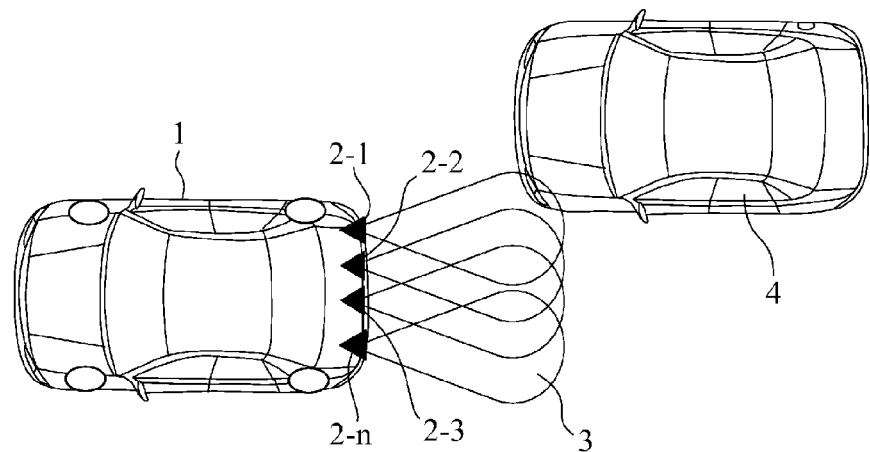
FIG. 1 is a plane view of a vehicle showing a detection state of an obstacle.

FIG. 1 is a plane view of a vehicle showing a state of measurement of an obstacle. A plurality of transmission and reception ultrasonic sensors 2-1 to 2-$n$ are arranged to a rear end surface of the vehicle 1, and a horizontal detection area 3 is formed. Another vehicle 4 approaching and located behind the vehicle is detected as an obstacle.

Figure 2:
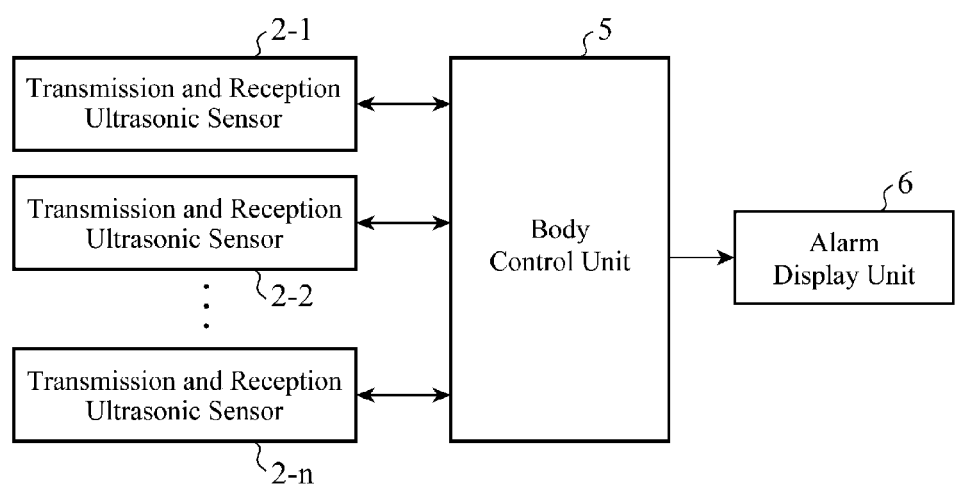
FIG. 2 is a block diagram showing an outline of an obstacle detection device in accordance with Embodiment 1 of the present invention.

FIG. 2 is a block diagram showing an outline of an obstacle detection device in accordance with a first embodiment. The obstacle detection device is comprised of a body control unit 5 to which the transmission and reception ultrasonic sensors 2-1 to 2-$n$ are connected, and an alarm display unit 6 for giving an alarm and producing a display according to an output from this body control unit 5.

Figure 3:
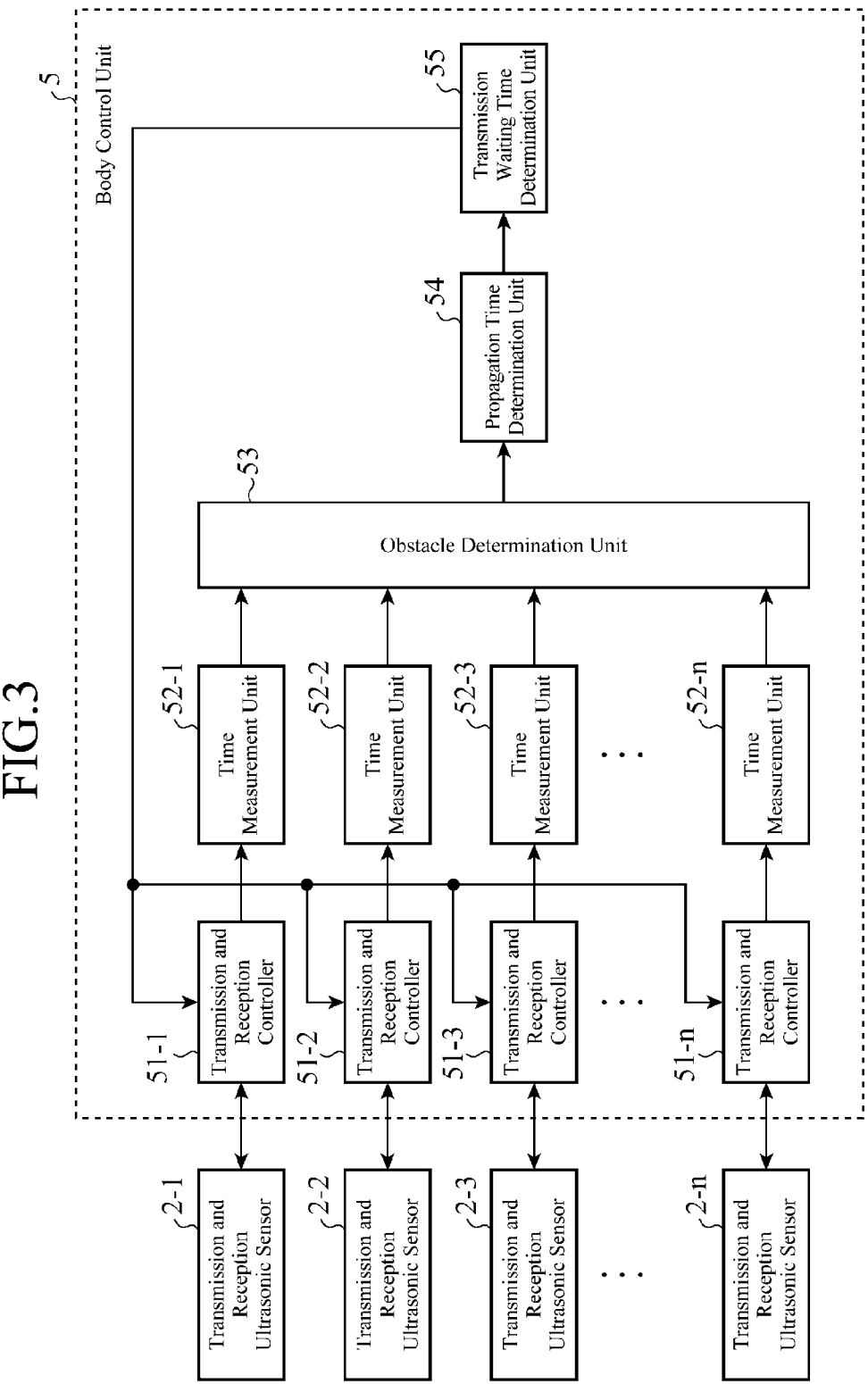
FIG. 3 is a block diagram showing the structure of the obstacle detection device in accordance with Embodiment 1 of the present invention in detail.

FIG. 3 is a block diagram showing the body control unit 5 in detail. The body control unit is provided with transmission and reception controllers 51-1 to 51-$n$ respectively connected to the transmission and reception ultrasonic sensors 2-1 to 2-$n$, time measurement units 52-1 to 52-$n$ respectively connected to the transmission and reception controllers 51-1 to 51-$n$, an obstacle determination unit 53 for determining the presence or absence of an obstacle according to the outputs of the time measurement units 52-1 to 52-$n$, a propagation time determination unit 54 for determining a propagation time according to the output of the obstacle determination unit 53, and a transmission waiting time determination unit 55 for determining whether a transmission waiting time has elapsed according to the output of the propagation time determination unit 54.

Figure 4:
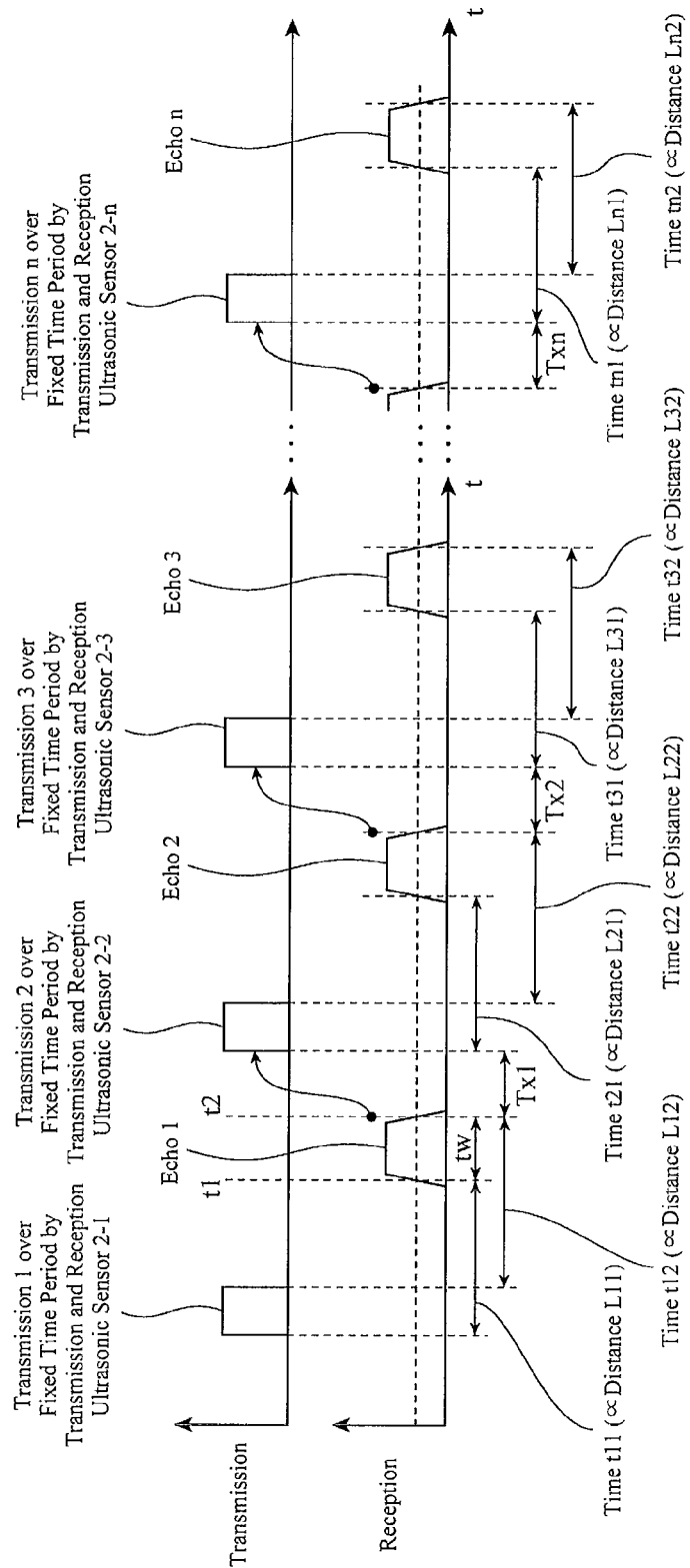
FIG. 4 is a timing diagram of transmission and reception by transmission and reception ultrasonic sensors in accordance with Embodiment 1.
Figures 1, 5:
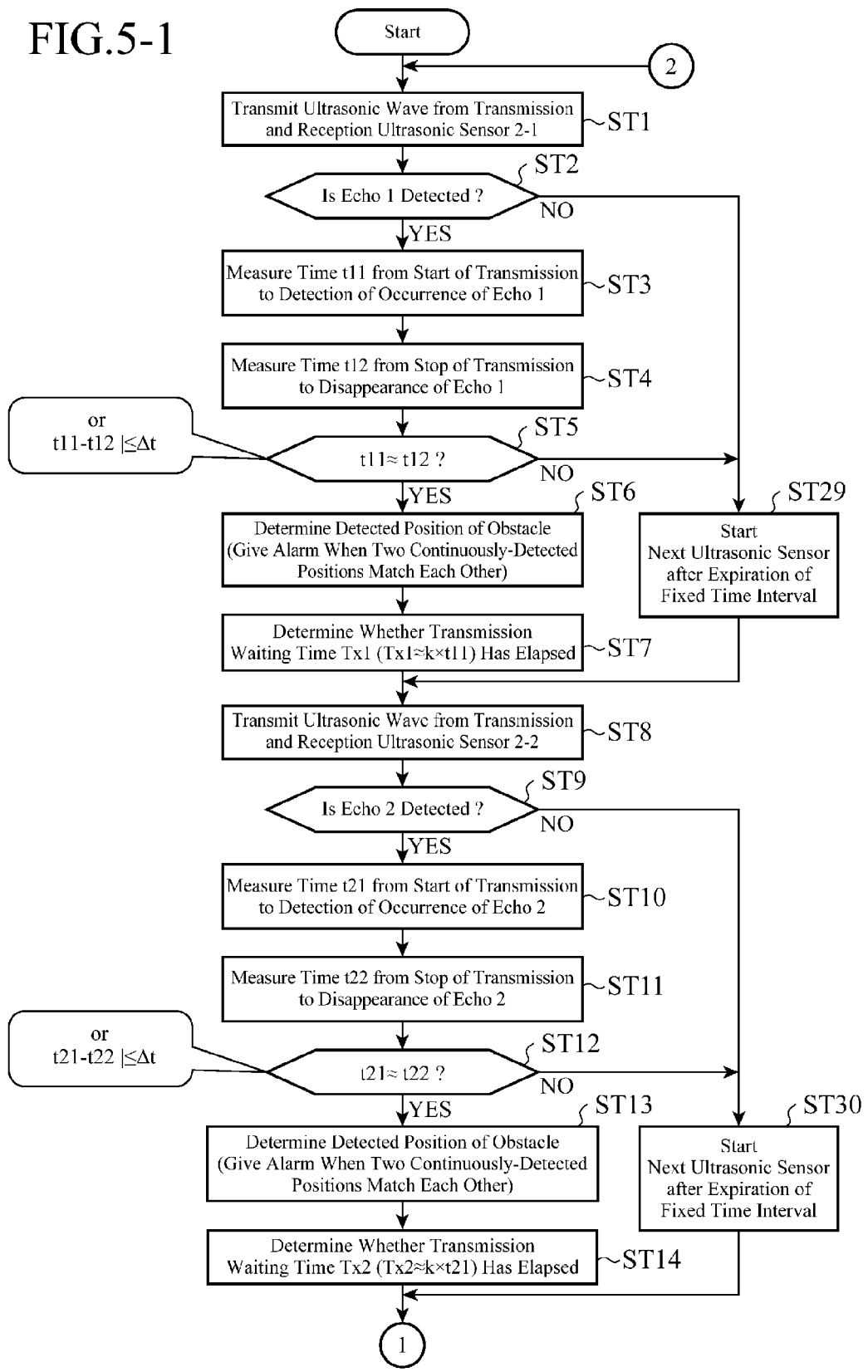
Figures 2, 5:
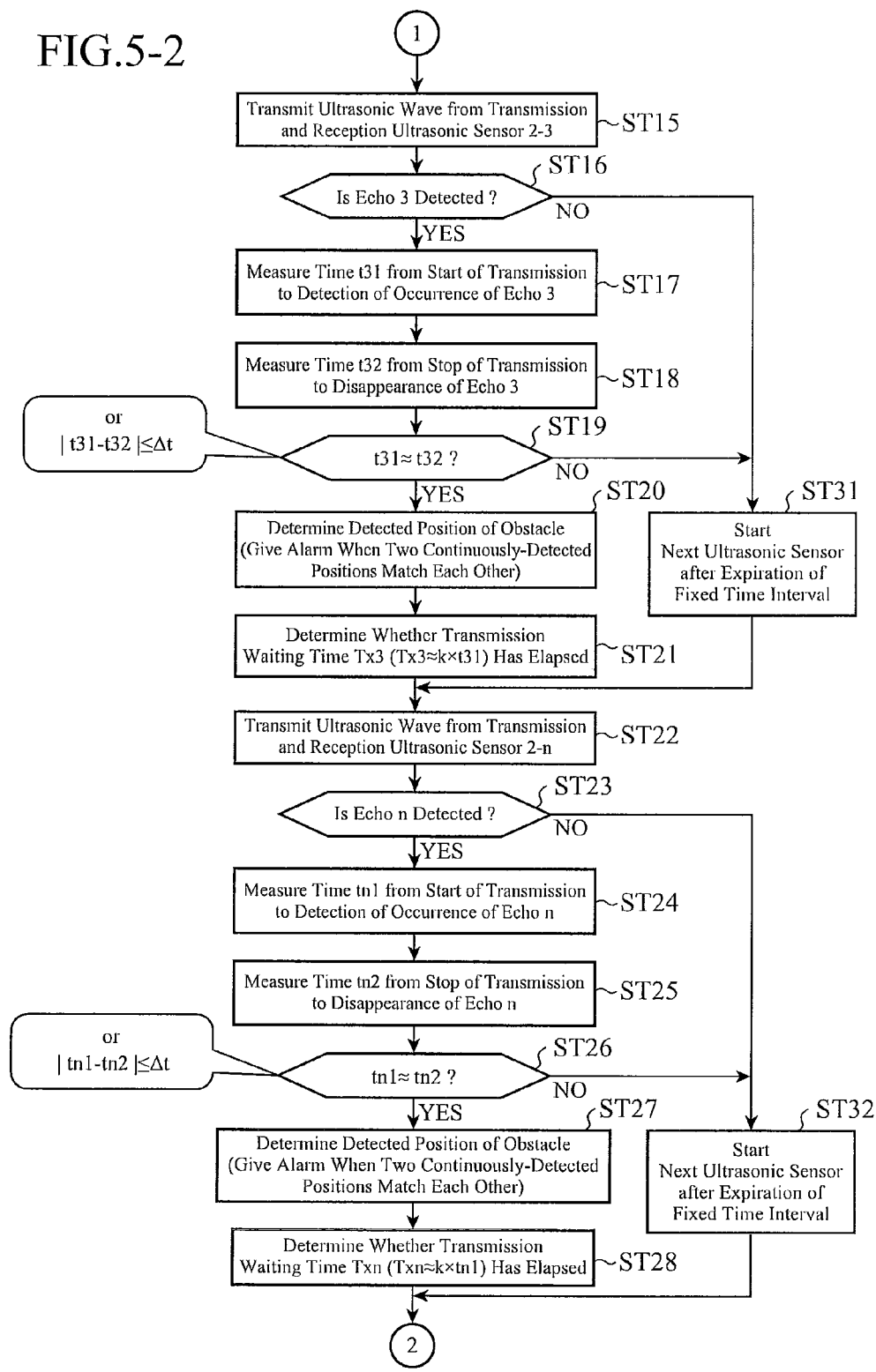

Hereafter, the operation of the obstacle detection device in accordance with Embodiment 1 will be explained with reference to a timing diagram of FIG. 4 showing times at each of which the transmission and reception ultrasonic sensors carry out transmission or reception, and a flow chart of FIG. 5. First, the body control unit transmits an ultrasonic wave during a fixed time period from the transmission and reception ultrasonic sensor 2-1 (step ST1). The body control unit then determines whether the transmission and reception ultrasonic sensor has detected a reflected wave 1 from an obstacle, i.e. an echo 1 (step ST2). When, in this step, determining NO, the body control unit shifts to step ST8 via step ST29, whereas when determining YES, the body control unit measures the time t11 ($\propto$ the distance L11) which has elapsed from the start of the transmission of the ultrasonic wave to the detection of the occurrence of the echo by using the time measurement unit 52-1 (step ST3), and, after that, measures the time t12 ($\propto$ the distance L12) which has elapsed from the stop of the transmission of the ultrasonic wave to disappearance of the echo 1 (step ST4).

Next, the body control unit determines whether or not t11 is nearly equal to t12 or whether or not |t11−t12| is equal to or smaller than Δt by using the obstacle determination unit 53 (step ST5). When, in this step, determining NO, the body control unit shifts to step ST8 via step ST29, whereas when determining YES, the body control unit determines the detected position of the obstacle by using the obstacle determination unit 53 (the body control unit gives an alarm when two continuously-detected positions match each other) (step ST6), and then determines whether a transmission waiting time Tx1 (Tx1≈k×t11) has elapsed (step ST7).

The body control unit then transmits an ultrasonic wave during a fixed time period from the transmission and reception ultrasonic sensor 2-2 (step ST8). The body control unit then determines whether the transmission and reception ultrasonic sensor has detected a reflected wave from the obstacle, i.e. an echo 2 (step ST9). When, in this step, determining NO, the body control unit shifts to step ST15 via step ST30, whereas when determining YES, the body control unit measures the time t21 ($\propto$ the distance L21) which has elapsed from the start of the transmission of the ultrasonic wave to the detection of the occurrence of the echo 2 by using the time measurement unit 52-2 (step ST10), and, after that, measures the time t22 ($\propto$ the distance L22) which has elapsed from the stop of the transmission of the ultrasonic wave to disappearance of the echo 2 (step ST11).

Next, the body control unit determines whether or not t21 is nearly equal to t22 or whether or not |t21−t22| is equal to or smaller than Δt by using the obstacle determination unit 53 (step ST12). When, in this step, determining NO, the body control unit shifts to step ST15 via step ST30, whereas when determining YES, the body control unit determines the detected position of the obstacle by using the obstacle determination unit 53 (the body control unit gives an alarm when two continuously-detected positions match each other) (step ST13), and then determines whether a transmission waiting time Tx2 (Tx2≈k×t21) has elapsed (step ST14).

After that, the body control unit switches from the transmission and reception ultrasonic sensor 2-2 to the transmission and reception ultrasonic sensor 2-3, and then switches from the transmission and reception ultrasonic sensor 2-3 to the transmission and reception ultrasonic sensor 2-$n$ to repeat the processes of steps ST15 to ST21 and ST22 to ST28. When a transmission and reception ultrasonic sensor cannot detect an echo, i.e. there is no obstacle, the body control unit cannot determine whether a transmission waiting time Tx1 (to Txn) has elapsed, the body control unit passes through a corresponding one of steps ST29 to ST32 in the route leading from step ST2 to step ST8 (or the route leading from step ST9 to step ST15, the route leading from step ST16 to step ST22, or the route leading from step ST23 to step ST1) and starts the next ultrasonic sensor after a lapse of a fixed time.

As mentioned above, because the obstacle detection device in accordance with Embodiment 1 can carry out two measurements at a time at which a reflected wave appears and at a time at which the reflected wave disappears, the obstacle detection device can reduce the time required for the determination to at least one-half that provided by a related art technique, and provides an advantage of improving the accuracy of the detection of an object moving at a relatively high speed.

Embodiment 2

FIG. 6 is a block diagram showing the structure of an obstacle detection device in accordance with Embodiment 2 in detail. The obstacle detection device is provided with a transmission control unit 56-1 connected to a transmission ultrasonic sensor 7-1, reception control units 57-1 to 57-$n$ respectively connected to reception ultrasonic sensors 8-1 to 8-$n$, time measurement units 58-1 to 58-$n$ respectively connected to the reception control units 57-1 to 57-$n$, an obstacle determination unit 59 for issuing a transmission command and a transmission stop command to the transmission ultrasonic sensor 7-1 via the transmission control unit 56-1, and for determining the presence or absence of an obstacle according to the outputs of the time measurement units 58-1 to 58-$n$, a propagation time determination unit 54 for determining a propagation time according to the output of the obstacle determination unit 59, and a transmission waiting time determination unit 55 for determining whether a transmission waiting time has elapsed according to the output of the propagation time determination unit 54, and is constructed in such a way as to furnish the output of this transmission waiting time determination unit 55 to the obstacle determination unit 59.

Figure 7:
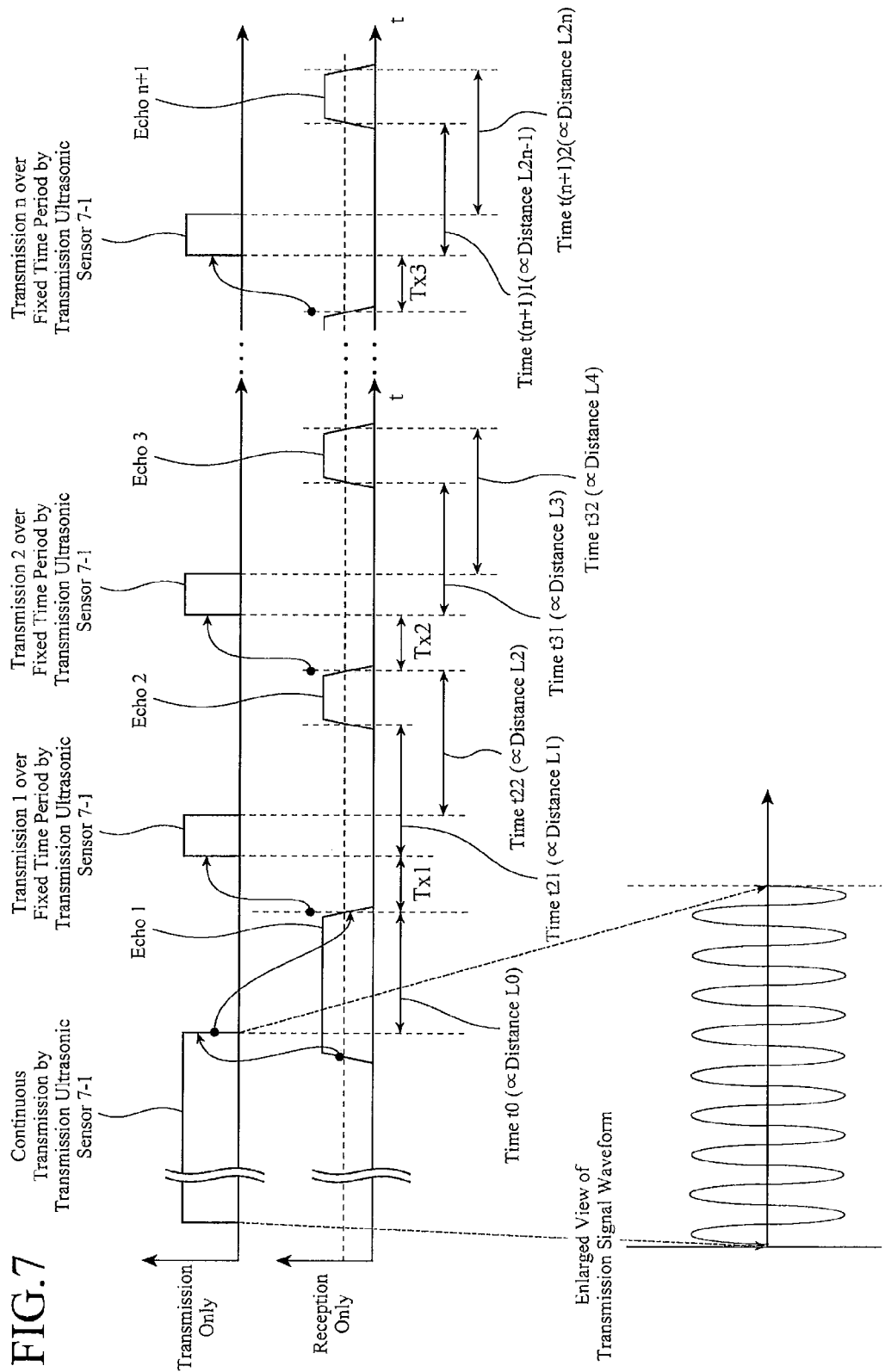
FIG. 7 is a timing diagram of transmission by an ultrasonic sensor exclusively for transmission in accordance with Embodiment 2, and reception by ultrasonic sensors exclusively for reception in accordance with Embodiment 2.
Figures 1, 8:
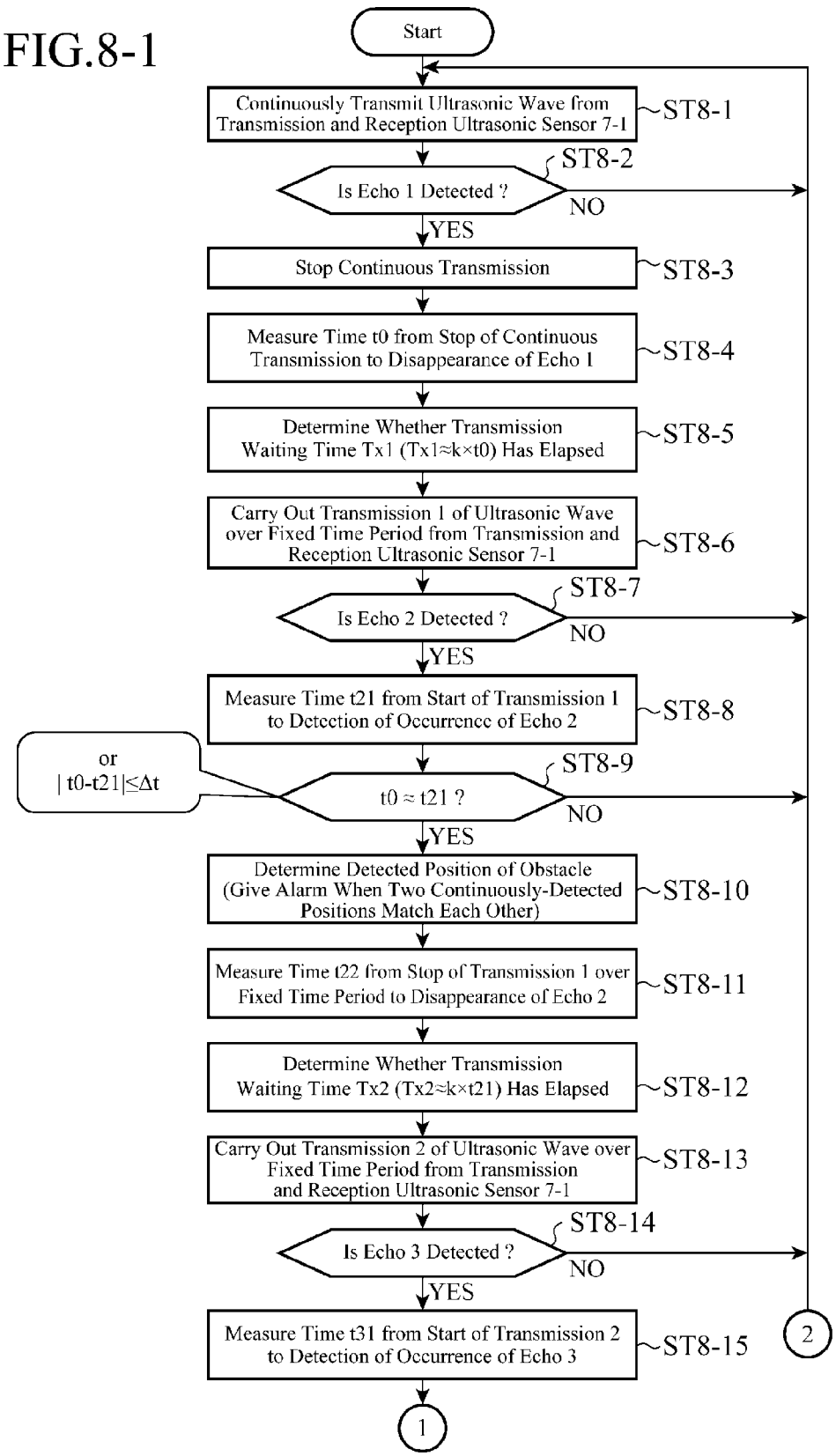
Figures 2, 8:
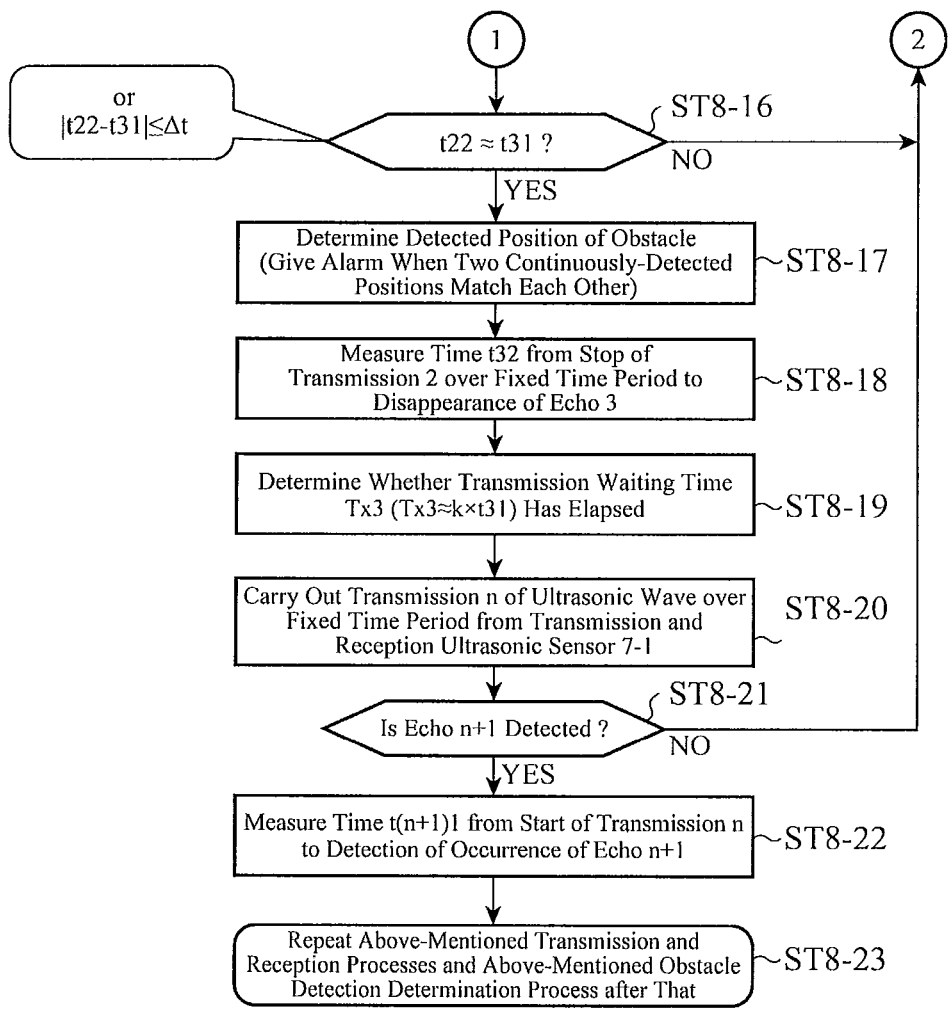

Hereafter, the operation of the obstacle detection device in accordance with Embodiment 2 will be explained with reference to a timing diagram of FIG. 7 showing times at each of which the transmission ultrasonic sensor 7-1 carries out transmission and times at each of which the reception ultrasonic sensors 8-1 to 8-$n$ carry out reception, and a flow chart of FIG. 8. First, the obstacle detection device transmits an ultrasonic wave continuously from the transmission ultrasonic sensor 7-1 (step ST8-1). The obstacle detection device then determines whether the reception ultrasonic sensors have detected a reflected wave from an obstacle, i.e. an echo 1 (step ST8-2). When, in this step, determining NO, the obstacle detection device returns to step ST8-1, whereas when determining YES, the obstacle detection device stops the continuous transmission of the ultrasonic wave from the transmission ultrasonic sensor 7-1 (step ST8-3), and measures the time t0 ($\propto$ the distance L0) which has elapsed from the stop of the continuous transmission to the time at which the echo 1 disappears by using the time measurement unit 52-1 (step ST8-4).

Next, the obstacle detection device determines whether a transmission waiting time Tx1 (Tx1≈k (constant)×t0) has elapsed (step ST8-5), and carries out a transmission 1 of an ultrasonic wave from the transmission ultrasonic sensor 7-1 during a fixed time period after determining that the transmission waiting time has elapsed (step ST8-6). The obstacle detection device then determines whether the reception ultrasonic sensors have detected a reflected wave from the obstacle, i.e. an echo 2 (step ST8-7). When, in this step, determining NO, the obstacle detection device returns to step ST8-1, whereas when determining YES, the obstacle detection device measures the time t21 ($\propto$ the distance L21) which has elapsed from the start of the transmission of the ultrasonic wave to the detection of the occurrence of the echo 2 (step ST8-8), and, after that, determines whether or not t0 is nearly equal to t21 or whether or not |t0−t21| is equal to or smaller than $\Delta t$ (step ST8-9). When, in this step, determining NO, the obstacle detection device returns to step ST8-1, whereas when determining YES, the obstacle detection device determines the detected position of the obstacle by using the obstacle determination unit (the body control unit gives an alarm when two continuously-detected positions match each other) (step ST8-10).

Next, the obstacle detection device measures the time t22 ($\propto$ the distance L2) which has elapsed from the stop of the transmission 1 over the fixed time period to the time at which the echo 2 disappears (step ST8-11), then determines whether a transmission waiting time Tx2 (Tx2≈k(constant)×t21) has elapsed (step ST8-12), and carries out a transmission 2 of an ultrasonic wave during a fixed time period from the transmission ultrasonic sensor 7-1 after determining that the transmission waiting time has elapsed (step ST8-13).

The obstacle detection device then determines whether the reception ultrasonic sensors have detected a reflected wave from the obstacle, i.e. an echo 3 (step ST8-14). When, in this step, determining NO, the obstacle detection device returns to step ST8-1, whereas when determining YES, the obstacle detection device measures the time t31 ($\propto$ the distance L3) which has elapsed from the start of the transmission 3 over the fixed time period to the detection of the occurrence of the echo 3 (step ST8-15), and, after that, determines whether or not t22 is nearly equal to t31 or whether or not |t22−t31| is equal to or smaller than $\Delta t$ (step ST8-16). When determining NO, the obstacle detection device returns to step ST8-1, whereas when determining YES, the obstacle detection device determines the detected position of the obstacle by using the obstacle determination unit 53 (the body control unit gives an alarm when two continuously-detected positions match each other) (step ST8-17).

Next, the obstacle detection device measures the time t32 ($\propto$ the distance L4) which has elapsed from the stop of the transmission 2 over the fixed time period to the time at which the echo 3 disappears (step ST8-18), then determines whether a transmission waiting time Tx3 (Tx3≈k(constant)×t31) has elapsed (step ST8-19), and carries out a transmission n of an ultrasonic wave during a fixed time period from the transmission ultrasonic sensor 7-1 after determining that the transmission waiting time has elapsed (step ST8-20).

The obstacle detection device then determines whether the reception ultrasonic sensors have detected a reflected wave from the obstacle, i.e. an echo n+1 (step ST8-21). When, in this step, determining NO, the obstacle detection device returns to step ST8-1, whereas when determining YES, the obstacle detection device measures the time t (n+1)1($\propto$ the distance L2$n$−1) which has elapsed from the start of the transmission n over the fixed time period to the detection of the occurrence of the echo n+1 (step ST8-22), and, after that, repeats the above-mentioned transmission and reception processes and the above-mentioned obstacle detection determination process (step ST8-23).

As mentioned above, because the obstacle detection device in accordance with Embodiment 2 transmits a continuous wave for the first time to monitor the presence or absence of an obstacle at all times until detecting an obstacle, the obstacle detection device provides a higher response speed for detection of an obstacle as compared with conventional intermittent detection at fixed time intervals. The obstacle detection device also provides an advantage of increasing the speed at which the obstacle detection device checks the detection of the obstacle a number of times in order to prevent itself from malfunctioning due to extraneous noise.

Embodiment 3

Figure 9:
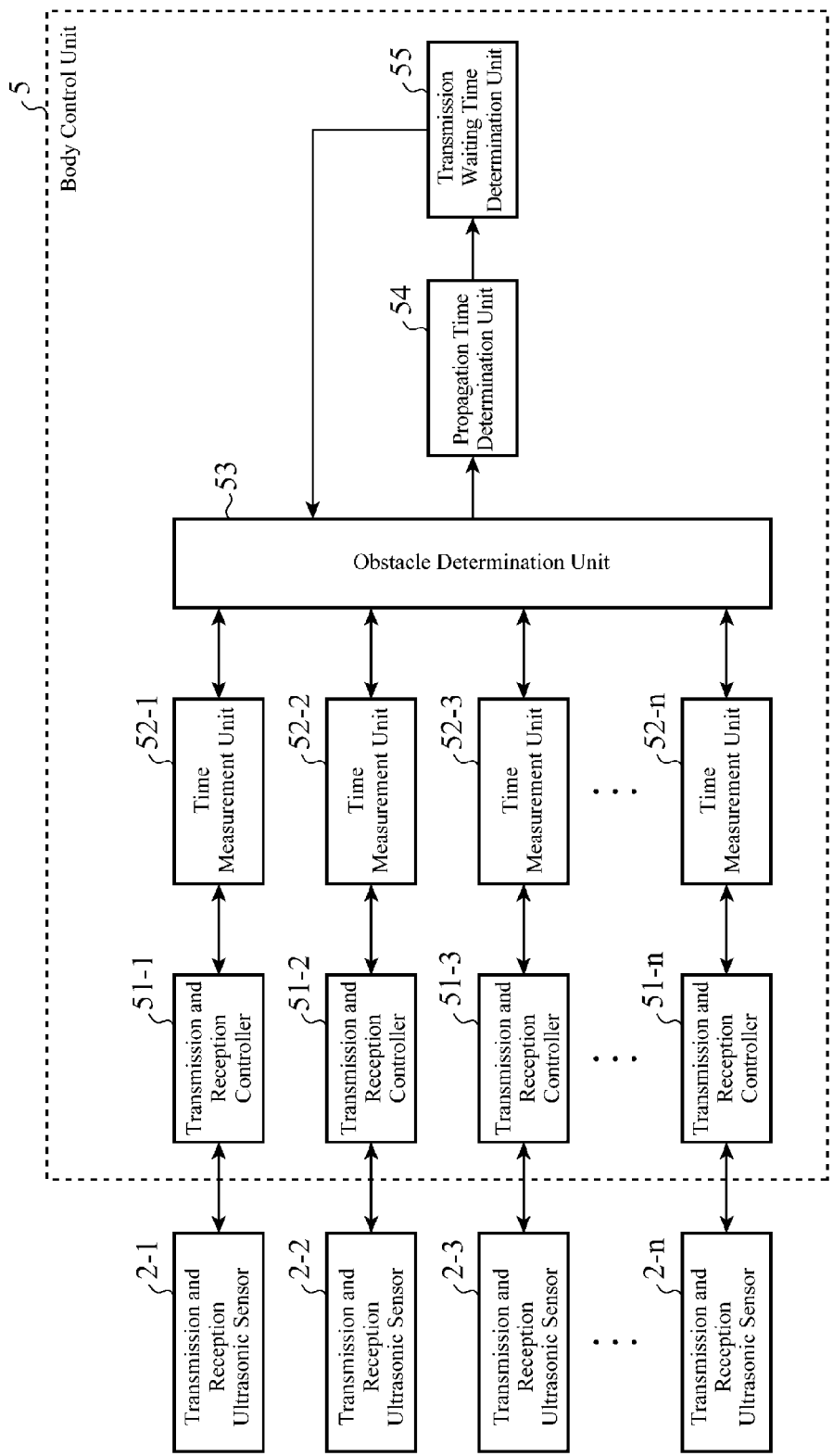
FIG. 9 is a block diagram showing the structure of an obstacle detection device in accordance with Embodiment 3 of the present invention in detail.

FIG. 9 is a block diagram showing the structure of an obstacle detection device in accordance with Embodiment 3 in detail. Although the obstacle detection device in accordance with this embodiment has the same components as those in accordance with Embodiment 1 shown in FIG. 3, connections among the components differ from those of the obstacle detection device in accordance with Embodiment 1. More specifically, in this Embodiment 3, signals are exchanged between transmission and reception controllers 51-1 to 51-$n$ and time measurement units 52-1 to 52-$n$, and between the time measurement units 52-1 to 52-$n$ and an obstacle determination unit 53, and the obstacle detection device is constructed in such a way as to furnish an output of a transmission waiting time determination unit 55 to the obstacle determination unit 53.

Figure 10:
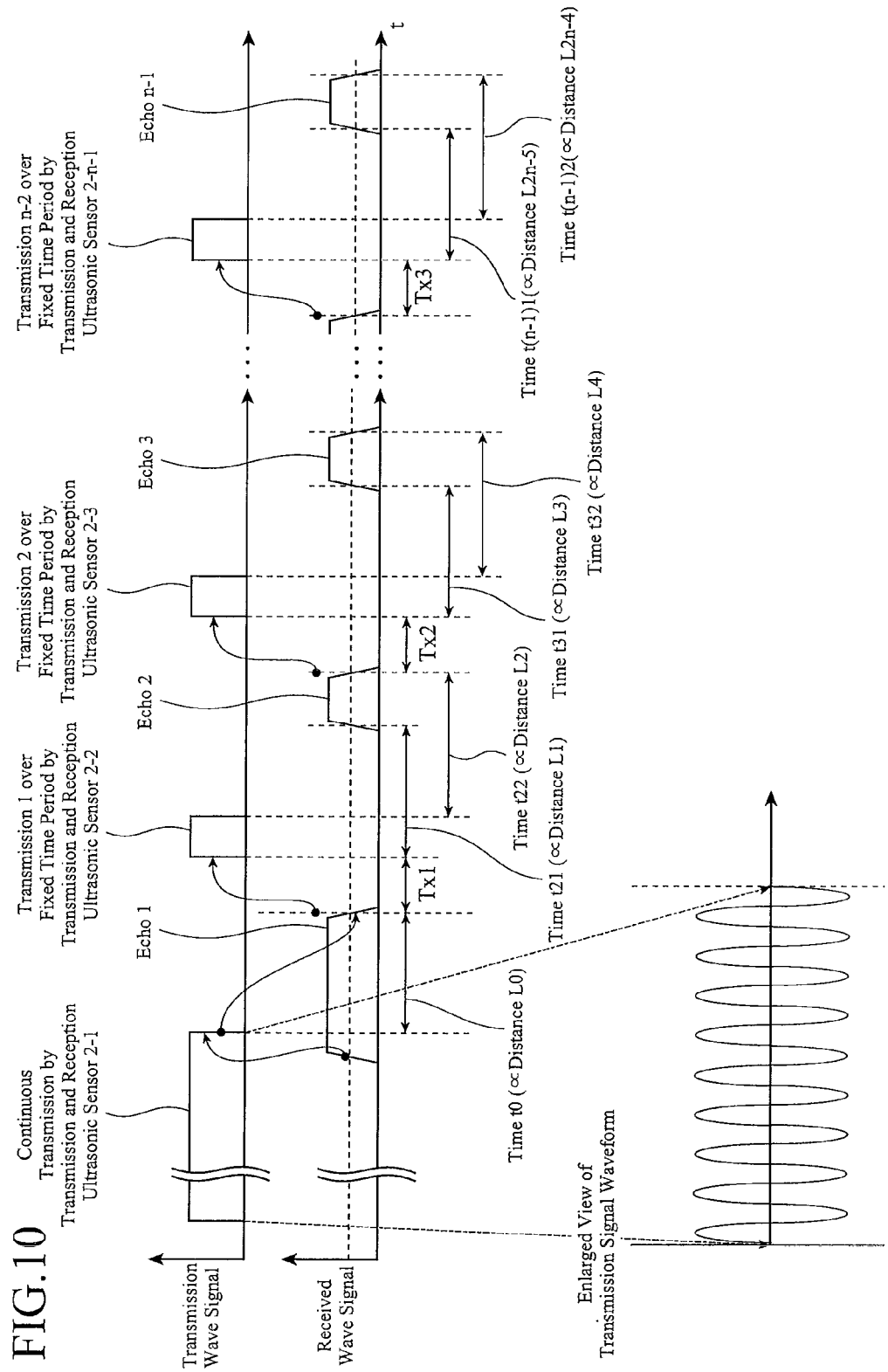
FIG. 10 is a timing diagram of transmission and reception by transmission and reception ultrasonic sensors in accordance with Embodiment 3.
Figures 1, 11:
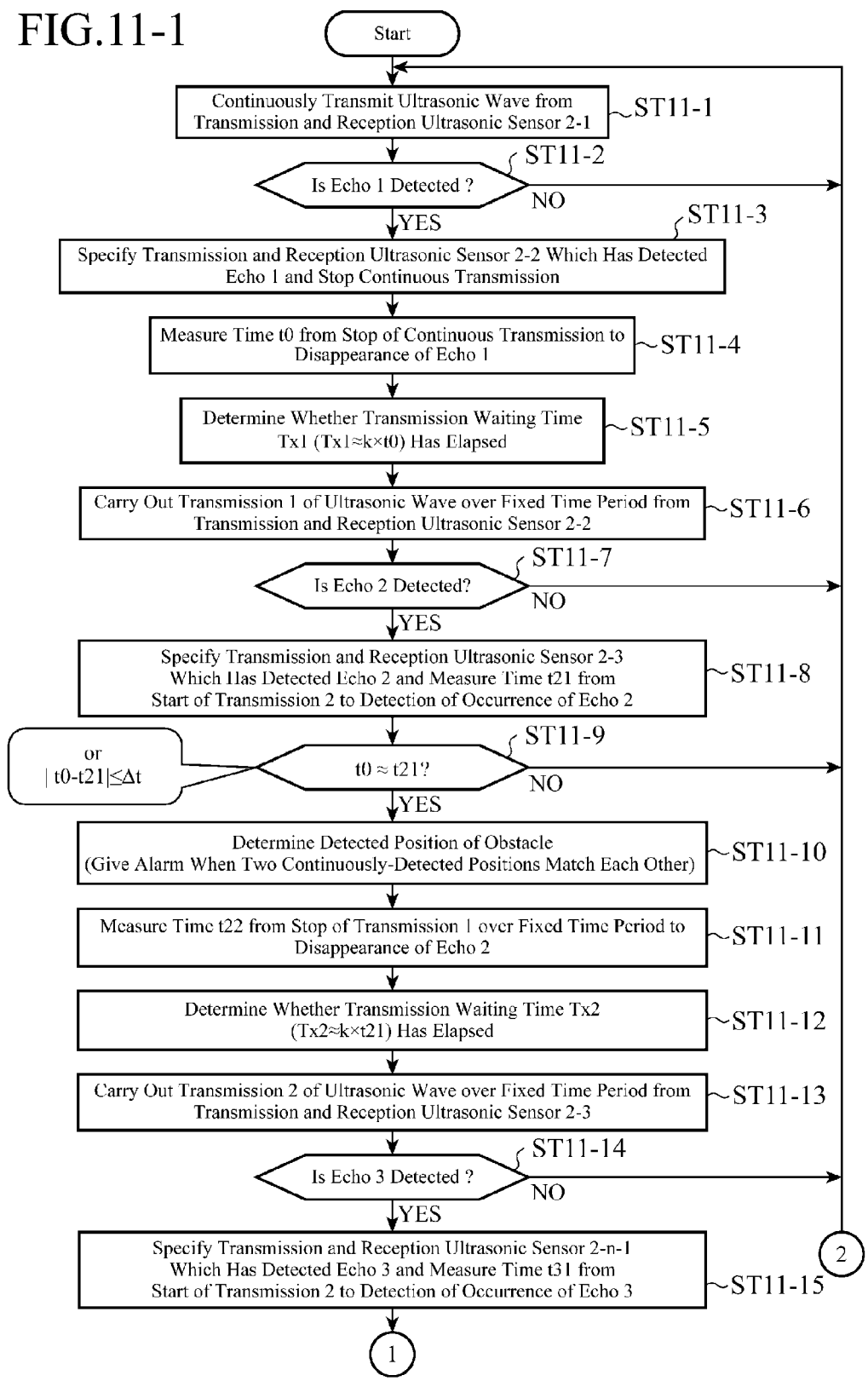
Figures 2, 11:
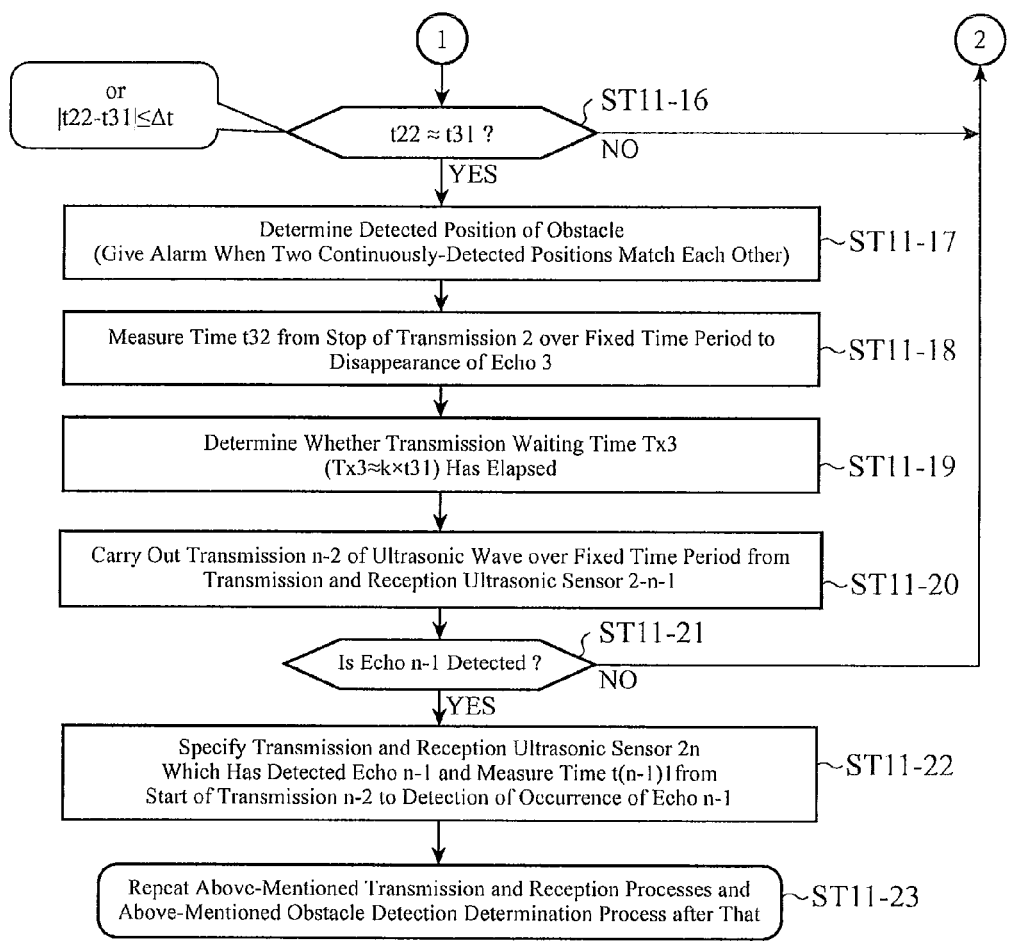

Hereafter, the operation of the obstacle detection device in accordance with Embodiment 3 will be explained with reference to a timing diagram of FIG. 10 showing times at each of which transmission and reception ultrasonic sensors carry out transmission or reception, and a flow chart of FIG. 11. First, the obstacle detection device continuously transmits an ultrasonic wave from the transmission and reception ultrasonic sensor 2-1 (step ST11-1). The obstacle detection device then determines whether the transmission and reception ultrasonic sensors have detected a reflected wave from an obstacle, i.e. an echo 1 (step ST11-2). When, in this step, determining NO, the obstacle detection device returns to step ST11-1, whereas when determining YES, the obstacle detection device specifies the transmission and reception ultrasonic sensor which has detected the echo 1, and stops the continuous transmission of the ultrasonic wave from the above-mentioned transmission and reception ultrasonic sensor 2-1 (step ST11-3).

After that, the obstacle detection device measures the time t0 ($\propto$ the distance L0) which has elapsed from the stop of the continuous transmission to the time at which the echo 1 disappears (step ST11-4). The obstacle detection device then determines whether a transmission waiting time Tx1 (Tx1≈k(constant)×t0) has elapsed (step ST11-5), and carries out a transmission 1 of an ultrasonic wave during a fixed time period from the transmission and reception ultrasonic sensor 2-2 after determining that the transmission waiting time has elapsed (step ST11-6).

The obstacle detection device then determines whether the transmission and reception ultrasonic sensors have detected a reflected wave from the obstacle, i.e. an echo 2 (step ST11-7). When, in this step, determining NO, the obstacle detection device returns to step ST11-1, whereas when determining YES, the obstacle detection device specifies the transmission and reception ultrasonic sensor which has detected the echo 2, measures the time t21 ($\propto$ the distance L1) which has elapsed from the start of the transmission 2 to the detection of the occurrence of the echo 2 (step ST11-8), and, after that, determines whether or not t0 is nearly equal to t21 or whether or not |t0–t21| is equal to or smaller than Δt (step ST11-9). When, in this step, determining NO, the obstacle detection device returns to step ST11-1, whereas when determining YES, the obstacle detection device determines the detected position of the obstacle by using the obstacle determination unit 53 (the body control unit gives an alarm when two continuously-detected positions match each other) (step ST11-10).

The obstacle detection device measures the time t22 ($\propto$ the distance L2) which has elapsed from the stop of the transmission 1 over the fixed time period to the time at which the echo 2 disappears (step ST11-11), then determines whether a transmission waiting time Tx2 (Tx2≈k (constant)×t21) has elapsed (step ST11-12), and carries out a transmission 2 of an ultrasonic wave over a fixed time period from the transmission and reception ultrasonic sensor 2-3 after determining that the transmission waiting time Tx2 has elapsed (step ST11-13).

The obstacle detection device then determines whether the transmission and reception ultrasonic sensors have detected a reflected wave from the obstacle, i.e. an echo 3 (step ST11-14). When, in this step, determining NO, the obstacle detection device returns to step ST11-1, whereas when determining YES, the obstacle detection device specifies the transmission and reception ultrasonic sensor which has detected the echo 3, measures the time t31 ($\propto$ the distance L3) which has elapsed from the start of the transmission 2 over the fixed time period to the detection of the occurrence of the echo 3 (step ST11-15), and, after that, determines whether or not t22 is nearly equal to t31 or whether or not |t22–t31| is equal to or smaller than Δt (step ST11-16). When, in this step, determining NO, the obstacle detection device returns to step ST11-1, whereas when determining YES, the obstacle detection device determines the detected position of the obstacle by using the obstacle determination unit 53 (the body control unit gives an alarm when two continuously-detected positions match each other) (step ST11-17).

The obstacle detection device measures the time t32 ($\propto$ the distance L4) which has elapsed from the stop of the transmission 2 over the fixed time period to the time at which the echo 3 disappears (step ST11-18), then determines whether a transmission waiting time Tx3 (Tx3≈k(constant)×t31) has elapsed (step ST11-19), and carries out a transmission 3 of an ultrasonic wave over a fixed time period from the transmission and reception ultrasonic sensor 2-n-1 after determining that the transmission waiting time Tx3 has elapsed (step ST11-20).

The obstacle detection device then determines whether the transmission and reception ultrasonic sensors have detected a reflected wave from the obstacle, i.e. an echo n−1 (step ST11-21). When, in this step, determining NO, the obstacle detection device returns to step ST11-1, whereas when determining YES, the obstacle detection device specifies the transmission and reception ultrasonic sensor which has detected the echo n−1, measures the time t(n−1)1 ($\propto$ the distance Ln−12n−5) which has elapsed from the start of the transmission 3 over the fixed time period to the detection of the occurrence of the echo n−1 (step ST11-22), and, after that, repeats the above-mentioned transmission and reception processes and the above-mentioned obstacle detection determination process (step ST11-23). As mentioned above, because the obstacle detection device in accordance with Embodiment 3 transmits a continuous wave to monitor the presence or absence of an obstacle at all times, the obstacle detection device provides the same advantages as those provided by Embodiment 2.

Embodiment 4

Although an obstacle detection device in accordance with Embodiment 4 which carries a process shown in FIG. 12 has the same structure as that in accordance with Embodiment 3, the obstacle detection device in accordance with Embodiment 4 differs from that in accordance with Embodiment 3 in that the obstacle detection device in accordance with Embodiment 4 specifies a transmission and reception ultrasonic sensor which has detected an obstacle, and then carries out transmission and reception continuously until does not detect the obstacle any more. First, the obstacle detection device continuously transmits an ultrasonic wave from a transmission and reception ultrasonic sensor 2-1 (step ST12-1). The obstacle detection device then determines whether the transmission and reception ultrasonic sensors have detected a reflected wave from an obstacle, i.e. an echo 1 (step ST12-2). When, in this step, determining NO, the obstacle detection device returns to step ST12-1, whereas when determining YES, the obstacle detection device specifies a transmission and reception ultrasonic sensor which has detected the echo 1, and stops the continuous transmission of the ultrasonic wave from the above-mentioned transmission and reception ultrasonic sensor 2-1 (step ST12-3).

After that, the obstacle detection device measures the time t0 which has elapsed from the stop of the continuous transmission to the time at which the echo 1 disappears (step ST12-4). The obstacle detection device then determines whether a transmission waiting time Tx1 (Tx1≈k(constant)× t0) has elapsed (step ST12-5), and carries out a transmission 1 of an ultrasonic wave during a fixed time period from a transmission ultrasonic sensor 2-2 after determining that the transmission waiting time Tx1 has elapsed (step ST12-6).

The obstacle detection device then determines whether the transmission and reception ultrasonic sensors have detected a reflected wave from the obstacle, i.e. an echo 2 (step ST12-7). When, in this step, determining NO, the obstacle detection device returns to step ST12-1, whereas when determining YES, the obstacle detection device specifies a transmission and reception ultrasonic sensor which has detected the echo 2, measures the time t21 which has elapsed from the start of the transmission 1 to the detection of the occurrence of the echo 2 (step ST12-8), and, after that, determines whether or not t0 is nearly equal to t21 (step ST12-9). When, in this step, determining NO, the obstacle detection device returns to step ST12-1, whereas when determining YES, the obstacle detection device determines the detected position of the obstacle by using an obstacle determination unit (the body control unit gives an alarm when two continuously-detected positions match each other) (step ST12-10).

The obstacle detection device measures the time t22 which has elapsed from the stop of the transmission 1 over the fixed time period to the time at which the echo 2 disappears (step ST12-11). The obstacle detection device then determines whether a transmission waiting time Tx2 (Tx2≈k(constant)× t21) has elapsed (step ST12-12), and carries out a transmission 2 of an ultrasonic wave during a fixed time period from the transmission and reception ultrasonic sensor 2-3 after determining that the transmission waiting time Tx2 has elapsed (step ST12-13).

The obstacle detection device then determines whether the transmission and reception ultrasonic sensors have detected a reflected wave from the obstacle, i.e. an echo 3 (step ST12-14). When, in this step, determining NO, the obstacle detection device returns to step ST11-1, whereas when determining YES, the obstacle detection device specifies a transmission and reception ultrasonic sensor which has detected the echo 3, measures the time t31 which has elapsed from the start of the transmission 2 over the fixed time period to the detection of the occurrence of the echo 3 (step ST12-15), and, after that, repeats the above-mentioned transmission and reception processes and the above-mentioned obstacle detection determination process (step ST12-16).

As mentioned above, because the obstacle detection device in accordance with Embodiment 4 specifies a transmission and reception ultrasonic sensor which has detected an obstacle, and then carries out transmission and reception continuously until does not detect the obstacle any more, the obstacle detection device provides an advantage of increasing the speed of response for detection of an obstacle detection.

Figure 13:
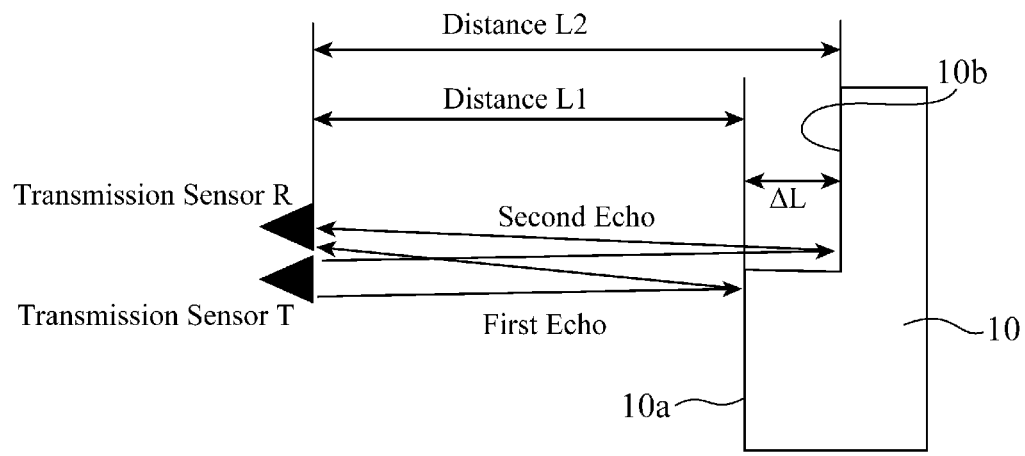
FIG. 13 is an explanatory drawing of a stair-like obstacle and propagation paths of echoes.
Figure 14:
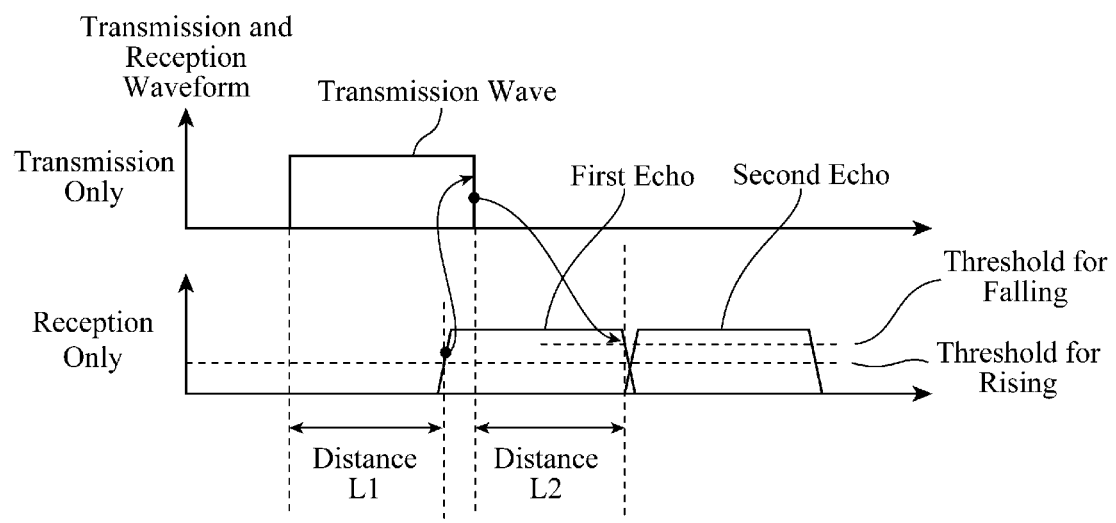
FIG. 14 is a timing diagram showing a relationship of a transmission wave transmitted to and a reflected wave reflected from the stair-like obstacle.

FIG. 13 shows a case in which an obstacle 10 existing opposite to a transmission ultrasonic sensor T and a reception ultrasonic sensor R has a step height ΔL in a direction of the length of a vehicle equipped with the obstacle detection device. An ultrasonic wave outputted from a transmission and reception ultrasonic sensor is reflected from a first side 10*a* and a second side 10*b* of the obstacle, and reflected waves are incident upon another transmission and reception ultrasonic sensor. In this case, because the first side 10*a* is closer to the transmission and reception ultrasonic sensors, as shown in FIG. 14, the reflected wave from the first side can be detected at an earlier time than the reflected wave from the second side 10*b*.

In this case, the time at which the reflected wave has either a constant level lower than its maximum level or a level equal to or lower than a fixed percentage of the maximum level is defined as the time at which the reflected wave disappears. As a result, the obstacle detection device can correctly detect the closest approach position of the obstacle having projections and depressions.

FIG. 15 shows a transmission and reception sequence of a plurality of transmission and reception ultrasonic sensors which carry out transmission and reception in order to detect an object existing in a large area at a high speed. For example, when detecting an object existing in an area in which transmission waves from the transmission and reception ultrasonic sensors 2-2 and 2-3 do not interfere each other, the obstacle detection device can simultaneously transmit transmission waves from the transmission and reception ultrasonic sensors 2-2 and 2-3, and the detection area becomes large accordingly. In a transmission and reception sequence at a time when detecting no obstacle, switching among the transmission and reception ultrasonic sensors 2-1 to 2-*n* is carried out sequentially in such a way that at a time of transmission of an ultrasonic way using the transmission and reception ultrasonic sensor 2-2, the other transmission and reception ultrasonic sensors 2-1, and 2-3 to 2-*n* are made to carry out reception, and at a time of transmission of an ultrasonic way using the transmission and reception ultrasonic sensor 2-3, the other transmission and reception ultrasonic sensors 2-1, 2-2, 2-*n*−1, and 2-*n* are made to carry out reception, as shown in table 1. Because the obstacle detection device is constructed in this way, the obstacle detection device can implement a wide detection area with a smaller number of transmission and reception ultrasonic sensors.

FIG. 16 shows a transmission and reception sequence at a time when detecting an obstacle. In this transmission and reception sequence, switching among the transmission and reception ultrasonic sensors 2-1 to 2-*n* is carried out sequentially in such a way that at a time of transmission of an ultrasonic way using the transmission and reception ultrasonic sensor 2-2, the other transmission and reception ultrasonic sensors 2-1, and 2-3 to 2-*n* are made to carry out reception, and at a time of transmission of an ultrasonic way using the transmission and reception ultrasonic sensor 2-3, the other transmission and reception ultrasonic sensors 2-1, 2-2, 2-*n*−1, and 2-*n* are made to carry out reception, as shown in table 2. When then detecting an obstacle, the transmission and reception ultrasonic sensor 2-3 keeps the current transmission state and the other transmission and reception ultrasonic sensors 2-1, 2-2, 2-*n*−1, and 2-*n* keep the current reception state. When then becoming unable to detect the reflected wave any more, the obstacle detection device switches the transmission and reception ultrasonic sensor 2-*n*−1 to a transmission state, and also switches the other transmission and reception ultrasonic sensors 2-1 to 2-3 and 2-*n* to a reception state. Because the obstacle detection device is constructed in this way, the obstacle detection device can implement a wide detection area with a smaller number of transmission and reception ultrasonic sensors, like in the above-mentioned case shown in FIG. 15.

Although in the explanation of each of above-mentioned embodiments, the example in which a comparison is made between the time which has elapsed from the start of transmission to the occurrence of an echo, and the time which has elapsed from the stop of the transmission to the disappearance of the echo is shown, a comparison between distances converted from these times can be alternatively made. Also in this case, the same advantages are provided. Further, although in the explanation of each of the embodiments illustrated, the example in which ultrasonic sensors are used as the distance sensors is shown, light sensors or radio wave sensors can be alternatively used as distance sensors. Also in this case, the same operation effects and the same advantages can be provided.

INDUSTRIAL APPLICABILITY

As mentioned above, because the obstacle detection device in accordance with the present invention carries out detection of an obstacle through two measurements at a time at which the obstacle detection device receives a reflected wave and at a time at which the reflected wave disappears, the obstacle detection device can reduce the time required for the determination to at least one-half that provided by a related art technique, and provides an advantage of improving the accuracy of the detection of an object moving at a relatively high speed. Therefore, the obstacle detection device in accordance with the present invention is suitable for use in a vehicle.

The invention claimed is:

1. An obstacle detection device comprising:
a plurality of distance sensors each having a transmitting and receiving function;
a transmission and reception controlling unit for controlling said distance sensors to cause said distance sensors to transmit a transmission wave during a fixed time period to detect a reflected waves from an obstacle;
a time measurement unit for measuring a first time which has elapsed from a time at which said transmission starts to a time at which a reflected wave is detected, and a second time which has elapsed a time at which said transmission is stopped to a time at which the reflected wave disappears; and
an obstacle determination unit for determining that an obstacle exists when a time difference between said first time and said second time is equal to or shorter than a predetermined allowed time.

2. The obstacle detection device according to claim 1, wherein a next transmission start time of the distance sensors after a lapse of a fixed time interval since a previous transmission is fixed or determined by multiplying a measured time by a constant coefficient.

3. The obstacle detection device according to claim 1, wherein when being unable to detect the reflected wave anymore after controlling said distance sensors to cause said distance sensors to transmit a transmission wave during a fixed time period, said obstacle detection device causes the distance sensors to start a next transmission after a lapse of a predetermined fixed time interval.

4. The obstacle detection device according to claim 1, wherein when a time difference between the time at which the reflected wave is detected and the time at which the reflected wave disappears falls within a predetermined time range, the obstacle detection device recognizes that the reflected wave is a real one.

5. The obstacle detection device according to claim 1, wherein a time at which the reflected wave has either a constant level lower than its maximum level or a level equal to or lower than a fixed percentage of the maximum level is defined as the time at which the reflected wave disappears.

6. An obstacle detection device comprising:
one or more first distance sensors each for transmitting a transmission wave toward an obstacle;
one or more second distance sensors each for detecting a reflected wave from said obstacle;
a transmission control unit for controlling one of said first distance sensors to cause this first distance sensor to continuously transmit a transmission wave;
a reception control unit for allowing one of said second distance sensors to detect a reflected wave from the obstacle;
a time measurement unit for stopping the continuous transmission of the transmission wave transmitted by said first distance sensor at a time at which said reflected wave is detected, and for detecting said obstacle and measuring a third time which has elapsed from a time at which said time measurement unit stops the continuous transmission of the transmission wave to a time at which said reflected wave disappears in said one of said second distance sensors which has detected said reflected wave; and
an obstacle determination unit for causing one of said first distance sensors to transmit a transmission wave during a fixed time period after said time measurement unit measures said third time, and for measuring a first time which has elapsed from a time at which said transmission starts to a time that a reflected wave is detected, and a second time which has elapsed from a time at which said transmission is stopped to a time at which the reflected wave disappears to determine that an obstacle exists when a time difference between said third time and said first time or between said first time and said second time is equal to or shorter than a predetermined allowed time.

7. The obstacle detection device according to claim 6, wherein, wherein a next transmission start time of the distance sensors after a lapse of a fixed time interval since a previous transmission is fixed or determined by multiplying a measured time by a constant coefficient.

8. The obstacle detection device according to claim 6, wherein said obstacle detection device determines a next transmission start time of the distance sensors after a lapse of a fixed time interval since a previous transmission in such away that when being unable to detect any reflected wave after controlling the distance sensors to cause these distance sensors to transmit a transmission wave during a fixed time period, said obstacle detection device starts a next transmission of a transmission wave over a fixed time period after a lapse of a predetermined fixed time interval.

9. The obstacle detection device according to claim 6, wherein distance sensors exclusively for transmission and distance sensors exclusively for reception, among a plurality of distance sensors mounted in a front portion, a rear portion, or a side portion of a vehicle, has a function of switching between transmission and reception in turn until the obstacle detection device detects an obstacle.

* * * * *